United States Patent [19]

Chee

[11] Patent Number: 4,717,094
[45] Date of Patent: Jan. 5, 1988

[54] AIRCRAFT ENGINE MOUNT SYSTEM WITH VIBRATION ISOLATORS

[75] Inventor: Wan T. Chee, Bellevue, Wash.

[73] Assignee: The Boeing Company, Seattle, Wash.

[21] Appl. No.: 864,486

[22] Filed: May 19, 1986

[51] Int. Cl.[4] .......................................... B64D 27/26
[52] U.S. Cl. ...................................... 244/54; 248/557
[58] Field of Search ..................... 244/54; 248/554, 557

[56] References Cited

U.S. PATENT DOCUMENTS

| | | | |
|---|---|---|---|
| 1,862,484 | 6/1932 | Lord et al. | |
| 2,028,549 | 1/1936 | Lord | 248/7 |
| 2,385,759 | 9/1945 | Henshaw | 248/5 |
| 2,395,143 | 2/1946 | Prewitt | 244/18 |
| 2,468,900 | 5/1949 | Thiry | 248/5 |
| 2,718,756 | 9/1955 | McDowall | 60/39.31 |
| 2,722,391 | 11/1955 | Krieghoff | 248/5 |
| 2,724,948 | 11/1955 | Hiscock et al. | 60/39.31 |
| 2,891,743 | 6/1959 | Bligard et al. | 248/557 |
| 3,168,270 | 2/1965 | Bligard et al. | 248/5 |
| 3,190,591 | 6/1965 | Bligard et al. | 248/5 |
| 3,222,017 | 12/1965 | Bobo | 248/5 |
| 3,288,404 | 11/1966 | Schmidt et al. | 248/5 |
| 3,831,888 | 8/1974 | Baker et al. | 244/54 |
| 4,044,973 | 8/1977 | Moorehead | 244/54 |

FOREIGN PATENT DOCUMENTS

| | | | |
|---|---|---|---|
| 478752 | 1/1938 | United Kingdom | 244/54 |
| 606444 | 8/1948 | United Kingdom | 4/115 |

Primary Examiner—Joseph F. Peters, Jr.
Assistant Examiner—Rodney Corl
Attorney, Agent, or Firm—Joan H. Pauly

[57] ABSTRACT

A laterally extending shaft (42) pivotably connects an aft engine mount (20) to a wing strut (4). Vertical isolators (52) are positioned around opposite ends (44) of the shaft (42). Each isolator (52) includes a housing (56) which moves vertically with the shaft (42). Upper and lower shock absorbing members (62, 64) are received into recesses (60) in the housing (56) and abut upper and lower portions of the strut (4). Each of two laterally spaced lateral isolators (72) has an annular isolator member (92) and a hat-shaped housing (78) with a cylindrical wall (80) that is closely received into a passageway (74) in the strut (4). The shaft (42) extends concentrically through and is spaced from the isolators (72). Opposite ends (96, 94) of each isolator member (92) abut a flange (82) on the housing (78) and the engine mount (20). Isolator members (62, 64, 92) include alternating elastomeric and metal layers. The engine mount (20) is dimensioned and the isolators (52, 72) are positioned to locate the elastomeric layers away from the heat of the engine (6).

31 Claims, 10 Drawing Figures

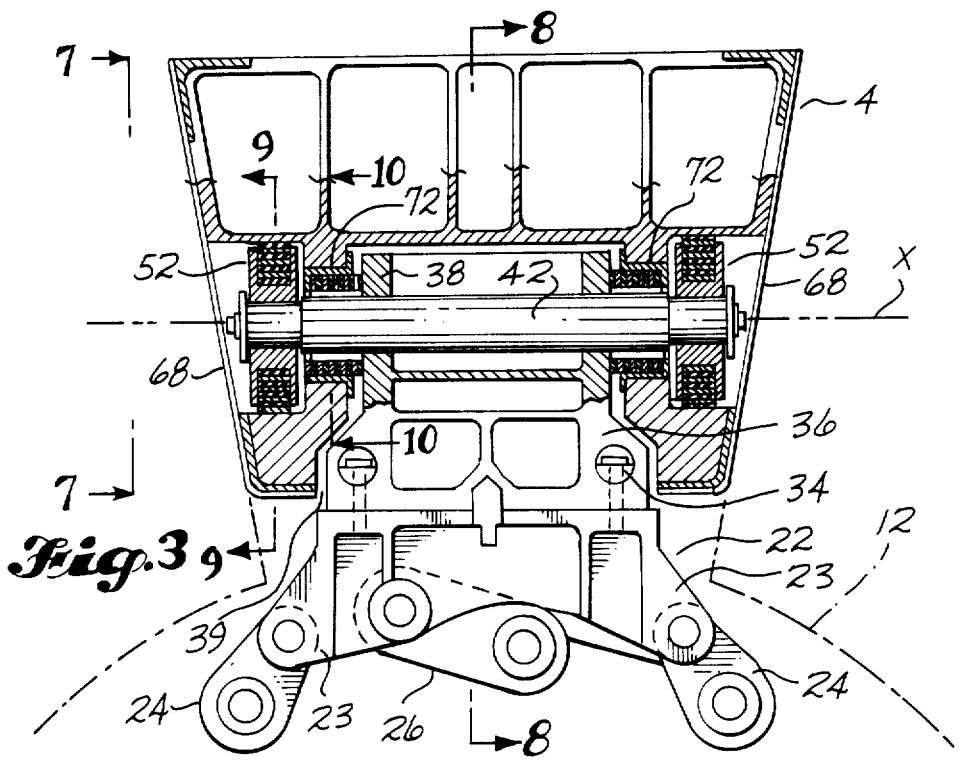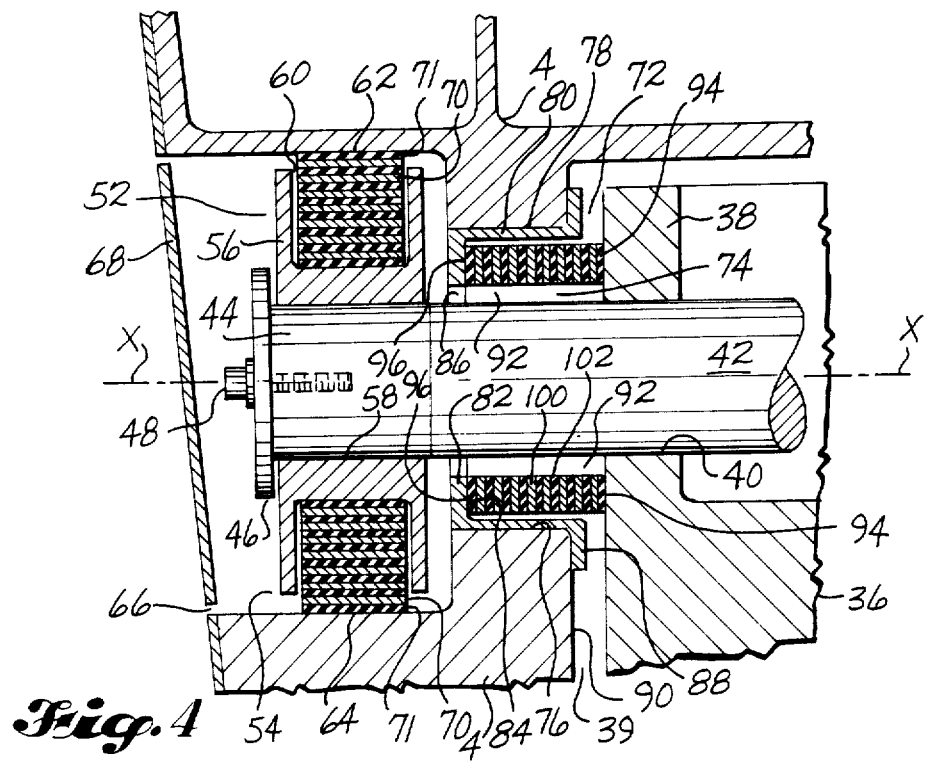

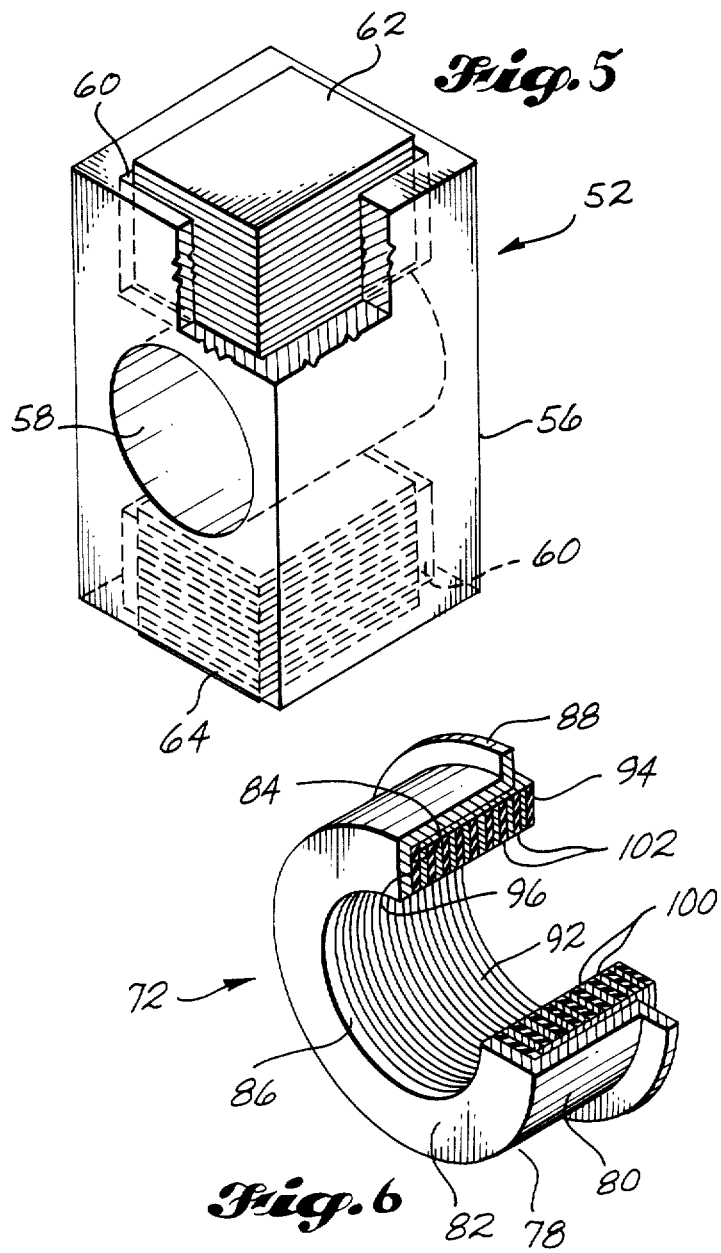

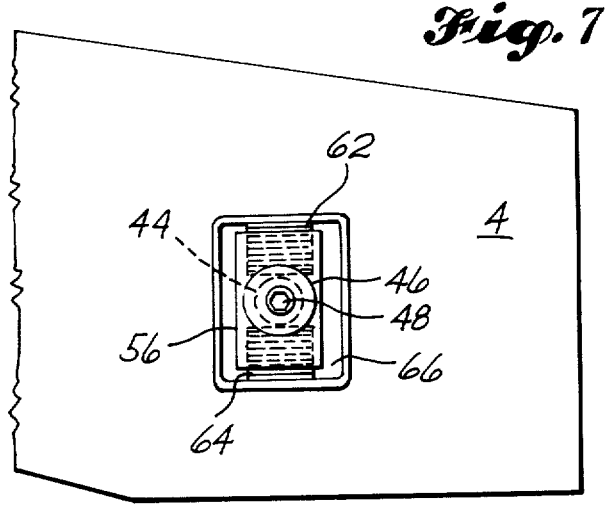
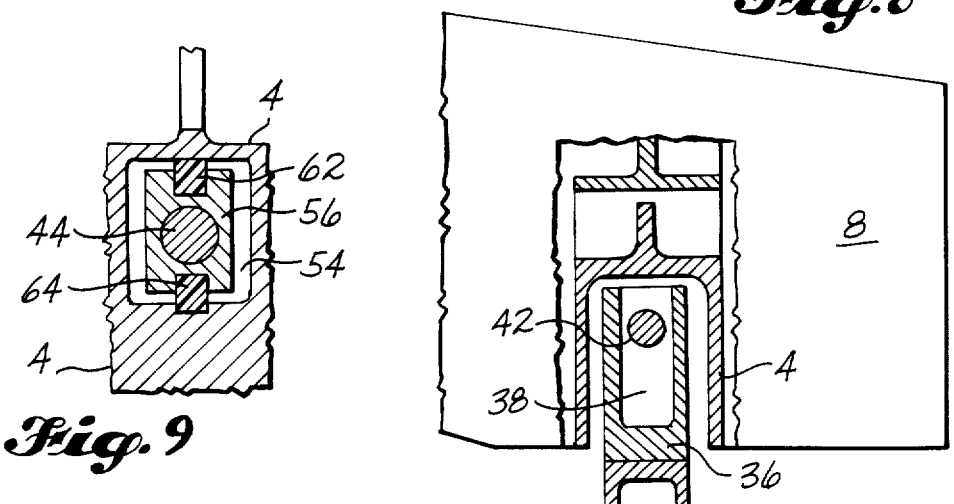
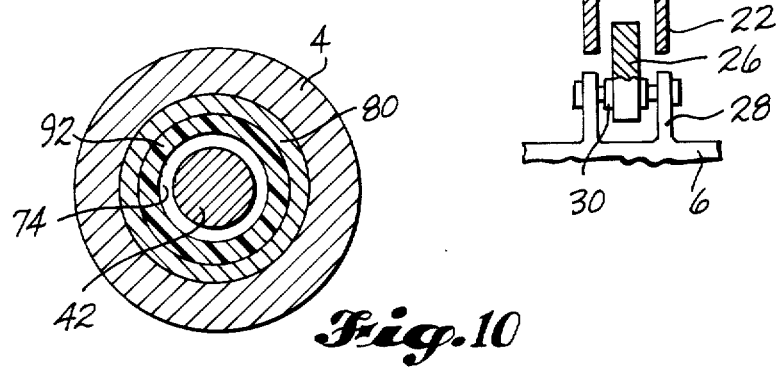

AIRCRAFT ENGINE MOUNT SYSTEM WITH VIBRATION ISOLATORS

DESCRIPTION

1. Technical Field

This invention relates to apparatus for mounting jet engines on aircraft and for dampening engine vibrations and, more particularly, to such apparatus that includes elastomeric elements for independently dampening vertical and lateral vibrations which elements are located in a relatively cool strut area to protect them from the heat of the turbine section of the engine.

2. BACKGROUND ART

In commercial passenger aircraft equipped with modern high efficiency turbojet engines, there is an annoying low frequency rumble noise in the passenger cabin caused by engine vibrations. The noise is transmitted mainly through the aft engine mounts. Since the noise is very annoying to passengers, aircraft manufacturers and airlines are devoting considerable effort to finding a solution to the problem of eliminating the noise.

Efforts to find a solution to the noise problem have been hampered by a number of factors. One such factor is that the temperature in the area of the aft mount is extremely high. In addition, space is severely limited in existing strut structures and mount systems. The space limitations, in combination with the high temperatures, have made it nearly impossible to install elastomeric isolators since existing desings would require the isolators to be located in an area in which the temperature is above the design operating temperature of elastomers. There have been a number of proposals to provide isolators made from materials other than elastomers in order to dampen the vibrations without redesigning the strut structure and mount system of the aircraft or rerouting system components. Isolators made from wire mesh material have been proposed, but have proved unsatisfactory mainly because the spring rate of wire mesh isolators is very difficult to predict and control.

Aft engine amounts are generally required to react vertical, lateral, and engine seizure (failure) torque loads. In wing mounted engines having vibration isolators, the vertical isolators are generally required to be stiffer than the lateral isolators. These requirements aggravate the problem of space limitations and have further hampered efforts to develop a mount system having satisfactory load-reacting and vibration-isolating characteristics.

The patent literature includes a number of examples of engine mount systems that include isolators. Ring mount systems with isolators in the ring area close to the engine are disclosed in U.S. Pat. Nos. 1,862,484, granted June 7, 1932, to T. Lord et al.; 2,385,759, granted Sept. 25, 1945, to R. C. Henshaw; 2,468,900, granted May 3, 1949, to L. F. Thiry; 2,722,391, granted Nov. 1, 1955, to R. T. Krieghoff; and 3,222,017, granted Dec. 7, 1965, to M. Bobo. Henshaw cites the close coupling of the mountings as having the advantage of efficiently restricting free movement. Bobo discloses an aft ring mount and describes it as having advantages over a three-point mount system. In the Krieghoff system, the isolators include cushions of alternating disks of rubber and metal.

U.S. Pat. No. 3,190,591, granted June 22, 1965, to E. J. Bligard et al., discloses a core assembly for a forward mount structure for an aircraft engine. U.S. Pat. No. 4,044,973, granted Aug. 30, 1977, to J. R. Moorehead, discloses a forward aircraft engine mount structure having elastomeric mounting pads located close to the engine fan casing. U.S. Pat. Nos. 2,395,143, granted Feb. 19, 1946, to R. H. Prewitt; and 3,288,404, granted Nov. 29, 1966, to W. E. Schmidt et al., disclose cushion mounts for helicopter engines. Schmidt et al. state that, in their system, equal spring rates in all directions perpendicular to the longitudinal axis of the engine are required. U.S. Pat. No. 2,028,549, granted Jan. 21, 1936, to H. C. Lord, discloses a cushioned mount for an automobile engine.

British Patent Specification No. 606,444, dated Aug. 13, 1948, in the name of Lord Manufacturing Company, discloses an aft ring mount for a propeller driven aircraft. A plurality of pins are spaced around the ring and are oriented parallel to the engine axis. Each pin has an elastomeric sleeve and two rubber washers positioned at the axial ends of the sleeves. The sleeves carry torque and longitudinal loads in shear and lateral and vertical loads in compression. The washers act as snubbers to prevent excessive movement in the longitudinal direction.

U.S. Pat. No. 2,724,948, granted Nov. 29, 1955, to G. H. Hiscock et al., discloses a mount system for a gas turbine aircraft engine in which four mounting units are spaced around the engine. The units are positioned inside the engine nacelle between the engine compressor and the nacelle firewall. Each of the four units includes a cushion of alternating disks of metal and resilient material. A casing surrounds each cushion and cooling air is conveyed through the casing to provide a heat barrier between the cushion and the hot region of the engine casing in which the mounting unit is located.

U.S. Pat. No. 3,168,270, granted Feb. 2, 1965, to E. J. Bligard et al., discloses an aft mount for a turbojet engine. The mount includes pivot means for allowing the engine to pivot about a laterally-extending axis to accommodate thermal expansion of the engine. Elastomeric elements are positioned around a rigid core in a housing positioned below the pivot axis. The elastomeric elements carry torque and longitudinal loads in shear and vertical and lateral loads in tension and compression. Apparently, the elements above and below the core are independent of the elements at the sides of the core. Bligard et al. state that the stiffness characteristics about three axes were tested at a temperature of 125° F.

U.S. Pat. No. 2,718,756, granted Sept. 27, 1955, to C. J. McDowall, discloses a rear mount for a propeller gas turbine engine. The engine and engine mount are pivotable relative to the aircraft about a laterally extending pivot axis defined by a connecting bolt. An elastomeric sleeve surrounds the bolt and is positioned between the bolt and the engine mount. No other cushioning elements for the rear mount are disclosed.

The above patents and the prior art that is discussed and/or cited therein should be studied for the purpose of putting the present invention into proper perspective relative to the prior art.

DISCLOSURE OF THE INVENTION

The subject of the invention is a system for mounting a jet engine on an engine support structure in an aircraft and for dampening engine vibrations. According to an aspect of the invention, the system comprises an engine mount having a first end portion attached to the engine, and an opposite second end portion. Connecting means pivotably connects the second end portion to the structure. The connecting means includes shaft portions that define a laterally extending pivot axis and that are positioned to move vertically with the second end portion of the engine mount. The system also includes first isolator means for dampening vertical vibrations and second isolator means for dampening lateral vibrations. The first isolator means is positioned vertically between the shaft portions and the structure and has an upper portion located above the shaft portions and a lower portion located below the shaft portions. The second isolator means includes two laterally spaced annular isolator members concentrically surrounding and spaced from the shaft portions and having one radial end abutting the second end portion of the engine mount and an opposite radial end abutting the structure. The first and second isolator means are independent of each other.

According to another aspect of the invention, the system comprises an engine mount having a first end portion attached to the engine, and an opposite second end portion. Connecting means pivotably connects the second end portion to the structure. The connecting means defines a laterally extending pivot axis. First and second isolator means are provided for dampening vertical and lateral vibrations, respectively. The first and second isolator means are independent of each other and are positioned between the second end portion and the structure and around the pivot axis. Each isolator means includes elastomeric elements. The engine mount is dimensioned and the first and second isolator means are positioned to locate the elastomeric elements of each isolator means far enough away from the engine to prevent heat from the engine from impairing the functioning of the isolator means. Preferably, each of the elastomeric elements is in a location where the maximum normal operating temperature is less than about 300° F.

A feature of the invention is connecting means which includes shaft portions that define the pivot axis and that are positioned to move vertically with the second end portion of the engine mount. The first isolator means is positioned vertically between the shaft portions and the structure and has an upper portion located above the shaft portions and a lower portion located below the shaft portions. Preferably, the shaft portions are opposite end portions of a shaft that extends laterally through aligned openings in the second end portion of the engine mount and the structure and is positioned to move vertically with the second end portion. The first isolator means comprises an isolator housing corresponding to each of the end portions of the shaft and surrounding and positioned to move vertically with the corresponding end portion of the shaft. The first isolator means also includes an upper shock absorbing member corresponding to each housing and a lower shock absorbing member corresponding to each housing. The upper member has a lower end abutting the corresponding housing and an upper end abutting the structure. The lower member has a lower end abutting the structure and an upper end abutting the corresponding housing. In the preferred embodiment, the structure includes an access opening adjacent to each of the end portions of the shaft, and each isolator housing is axially slidable along the corresponding end portion of the shaft.

The preferred characteristics of the connecting means and the first isolator means described above have a number of advantages. Providing the first isolator means with upper and lower portions that are above and below the pivot axis, respectively, ensures that vibrations in both vertical directions will be dampened and provides resistance to bending of the shaft when there are rotational forces on the shaft. The mounting of the isolator housings of the first isolator means on opposite end portions of the shaft provides a maximized lateral spacing to maximize the capacity of the system to resist moments. The combination of isolator housings that are slidable along the end portions of the shaft and the access openings in the structure contribute significantly to the ease of manufacture and installation of the system and greatly facilitate maintenance of the system. Should the need arise, access to each isolator housing and its shock absorbing members is readily available, and the housing and shock absorbing members may be easily and quickly inspected and/or replaced.

Another feature of the invention is second isolator means that comprises two laterally spaced annular isolator members concentrically surrounding and spaced from the laterally extending shaft. Each annular isolator member has one radial end abutting the second end portion of the engine mount and an opposite radial end abutting the engine support structure. Preferably, the structure includes a strut, and an annular housing corresponding to each isolator member of the second isolator means. Each annular housing has a vertical flange against which said opposite radial end of the corresponding isolator member abuts. Each annular housing is removably secured to the strut. In the preferred embodiment, the strut includes a passageway corresponding to each annular housing and defined by an inner cylindrical sidewall, and each annular housing is generally hat-shaped. Each annular housing includes a laterally extending wall which abuts the inner cylindrical sidewall of the corresponding passageway and from one end of which the vertical flange extends radially inwardly toward the shaft. Each such housing also has a vertical mounting flange that extends radially outwardly from the other opposite end of the laterally extending wall and that abuts a surface of the strut facing the second end portion of the engine mount.

The preferred features of the second isolator means discussed above have a number of advantages. The arrangement of two laterally spaced isolator members surrounding the pivot shaft provide resistance to rotational forces as well as lateral forces. The provision of an annular housing for each isolator member, which housing is removably secured to the strut, facilitates manufacture, installation, and maintenance of the second isolator means. The preferred hat-shaped configuration of the isolator housings and the manner in which they are attached to the strut provide a secure connection to the strut and an effective reacting surface while maximizing the efficient use of the space available. The arrangement makes it possible to position the isolator members within passageways in the strut rather than between the strut and the engine mount. Thus, the lateral space between the engine mount and the strut can be minimized to make the strut/mount structure more compact.

The mounting and dampening system of the invention may be used in connection with a variety of types of jet engines mounted in various locations and in both forward and aft mounts. However, the system is particularly well adapted for mounting a turbojet engine having an aft turbine section on an aircraft engine support structure. According to an aspect of the invention, the system comprises an aft engine mount having a first end portion attached to an aft portion of such a turbojet engine. The system also includes the connecting means and first and second isolator means described above. The engine mount is dimensioned and the isolator means are positioned to locate the elastomeric elements of the isolator means far enough away from the turbine section of the engine to prevent heat from the turbine section from impairing the functioning of the isolator means. In this type of environment, the heat problems are particularly severe, and the arrangement of the elements of the system of the invention is particularly advantageous.

In systems constructed according to the invention, the efficient use of the space available is maximized. This makes it possible to position the isolating means in an area where the temperature does not exceed acceptable operating temperatures for elastomeric materials. The ability to use elastomeric materials in the isolators avoids the problems encountered in the use of nonelastomeric materials and achieves the advantages of elastomers, including their relatively high reliability, durability, predictability, and low cost.

The overall structure of the system of the invention is relatively inexpensive and easy to manufacture, install, and maintain. The efficient and economical manufacture, installation, and maintenance of the system is further enhanced by the system's ready capacity to incorporate known design elements. The connection between the first end portion of the engine mount and the engine may be provided with torque reacting capability using known linkage arrangements. Thus, an aft engine mount that is a part of a system constructed in accordance with the invention may easily be provided with the capacity to react vertical, lateral, and engine seizure torque loads and thereby meet all load carrying requirements. This can be accomplished without exceeding space limitations and without sacrificing the advantages of elastomeric isolators. In addition, a conventional four tension bolt engine installation system may be readily incorporated into the system of the invention. This permits the engine to be installed on the aircraft by making tension bolt connections between the opposite end portions of the engine mount in a conventional manner, and to thereby minimize any need for changes in installation facilities or retraining of installation personnel.

The independence of the vertical and lateral isolator means from each other in systems of the invention makes it possible for the vertical and lateral isolators to have different spring rates. Therefore, each of the isolator means may be adjusted to meet the particular stiffness requirements for the particular mode of vibration being isolated. Thus, the effective isolation of vibrations and the consequent reduction of cabin noise may be maximized without any need for compromise between differing spring rate requirements.

These and other advantages and features will become apparent from the following detailed description of the best mode for carrying out the invention.

BRIEF DESCRIPTION OF THE DRAWINGS

In the drawings, like element designations refer to like parts throughout, and:

FIG. 3 is a sectional view taken along the line 3—3 in FIG. 2, with parts shown in elevation.

FIG. 4 is an enlarged fragmentary view of a portion of FIG. 3.

FIG. 5 is a pictorial view of the preferred embodiment of the vertical isolator shown in FIGS. 3 and 4, with a portion of the isolator housing broken away.

FIG. 6 is a pictorial view of the preferred embodiment of the lateral isolator shown in FIGS. 3 and 4, with a portion of the isolator cut away.

FIG. 7 is an elevational view taken along the line 7—7 in FIG. 3, with foreground portions cut away.

FIG. 8 is a sectional view taken along the line 8—8 in FIG. 3, with foreground portions cut away.

FIGS. 9 and 10 are sectional views taken along the lines 9—9 and 10—10, respectively, in FIG. 3.

BEST MODE FOR CARRYING OUT THE INVENTION

Figure 1:
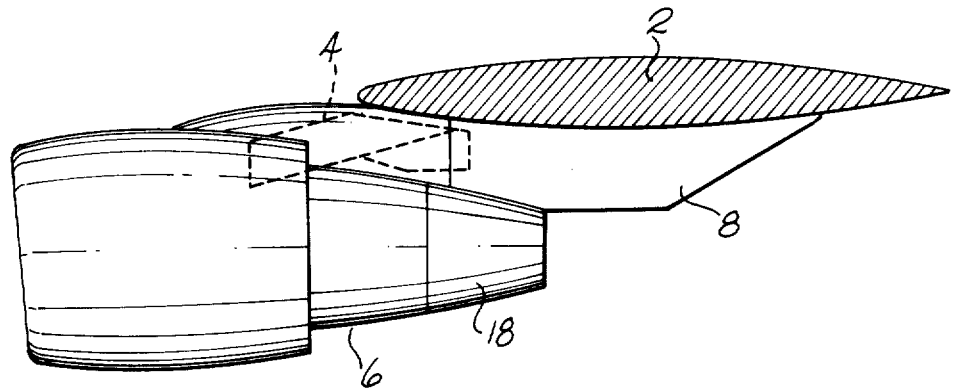
FIG. 1 is a simplified elevational view of a jet engine mounted on a wing of an aircraft, with the wing shown in section.

The drawings show a system for mounting a jet engine on an aircraft engine support structure. The system shown in the drawings is constructed according to the invention and also constitutes the best mode of the invention currently known to the applicant. In the drawings, the system of the invention is shown in use to mount the aft turbine section 18 of a turbojet engine 6 to the wing 2 of an aircraft. It is anticipated that the illustrated use will be the primary use for the system of the invention. However, it is of course to be understood that the system of the invention may also be used to advantage in association with other types of jet engines, parts of the aircraft other than the wing, and forward as well as aft engine mounts.

Figure 2:
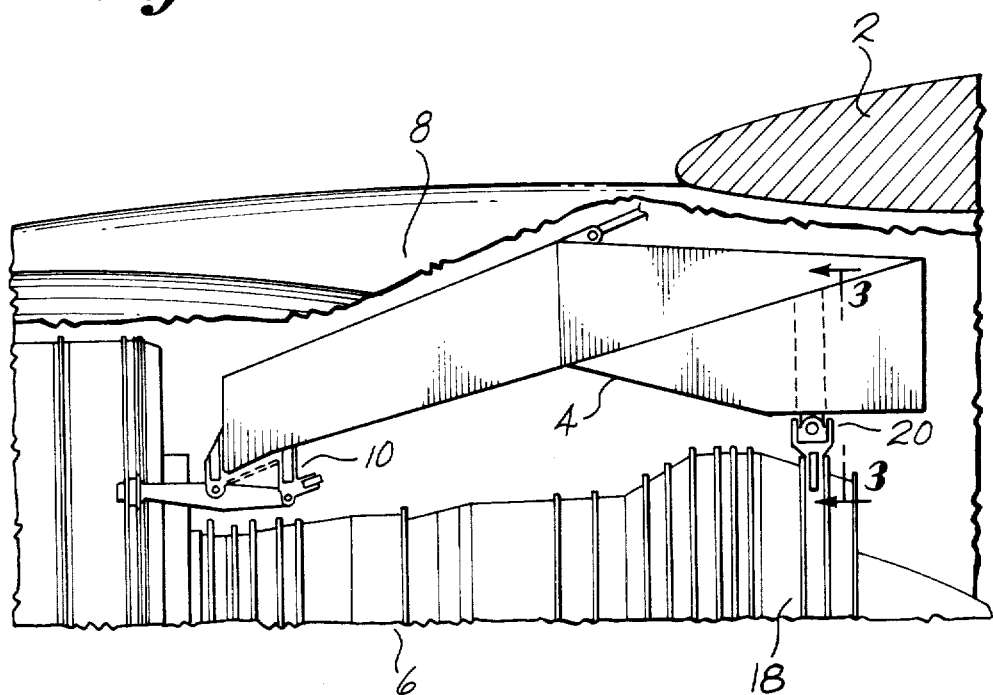
FIG. 2 is an enlarged view of a portion of FIG. 1, with foreground portions cut away to reveal the engine support structure.

Referring to FIGS. 1 and 2, the engine 6 is shown mounted to a wing 2 of an aircraft by means of an engine support structure including a strut 4. A strut fairing 8 is provided in a known manner. A forward part of the engine 6 is secured to a forward portion of the strut 4 by means of a forward mount 10. The forward mount 10 may take a variety of known forms. The aft turbine section 18 of the engine 6 is connected to an aft portion of the strut 4 by means of an aft mount 20 constructed in accordance with the invention.

The aft engine mount 20 includes a first or lower end portion 22 and a second or upper end portion 36. In the assembly of the aircraft, the lower end portion 22 is installed on the engine 6 as part of the engine buildup, and the upper end portion 36 is attached to the strut 4 as part of the strut assembly. The lower and upper end portions 22, 36 are then connected together by means of a known four tension bolt arrangement to install the engine 6 on the aircraft. Two of the tension bolt connections are shown in FIG. 3, with the tension bolts being designated by the reference numeral 34.

The attachment of the lower end portion 22 to the engine 6 is not a part of the present invention and may be accomplished by a number of means. The preferred means shown in the drawings is the subject of the applicant's copending application Ser. No. 578,072, filed Dec. 8, 1983, and entitled "Aft Engine Mount". Referring to FIGS. 3 and 8 of the present application, the lower end portion 22 has two laterally opposite, laterally and downwardly extending arms 23. Each of these arms 23 is pivotably attached to one end of a side link 24. The opposite end of each link 24 is attached to the engine by means of a spherical bearing. One end of a center link 26 is attached by a spherical bearing to the lower end portion 22 of the engine mount 20 between the two arms 23. The other end of the link 26 is attached to mounting ears 28 carried by the engine 6 by means of a spherical bearing 30. The last described attachment is shown in FIG. 8. The arrangement of the links 24, 26 and spherical bearings permits longitudinal growth of the engine 6 due to thermal expansion and provides torque reacting capability. As noted in the above-cited copending application, the arrangement is sufficiently compact to allow it to lie within the smooth contour of the engine cowling 12 (FIG. 3) to thereby reduce aerodynamic drag.

Referring to FIGS. 3 and 4, the upper end portion 36 of the engine mount 20 extends from its tension bolt connection to the lower end portion 22 upwardly into an opening 39 in the strut 4. The upper end portion 36 is attached to the strut 4 by a shaft 42 which extends laterally through aligned openings 40, 54, 74 in the upper end portion 36 and the strut 4. The shaft 42 defines a laterally extending pivot axis X about which the aft mount 20 is pivotable relative to the strut 4 to allow for longitudinal engine thermal growth. The upper mount portion 36 has two laterally spaced mounting lugs 38, each of which has an opening 40 extending laterally therethrough for receiving the shaft 42. The shaft 42 is closely received into the openings 40 to position the shaft 42 to move vertically with the upper mount portion 36.

The shaft 42 extends laterally outwardly from each of the mounting lugs 38 through laterally extending openings 54, 74 in the strut 4. Each end of the shaft 42 terminates in a reduced diameter portion 44. An end cap 46 is secured to the outer end of each reduced diameter portion 44 by suitable means, such as the bolts 48 shown in the drawings, to limit lateral movement of the shaft 42 relative to the strut 4. The shaft 42 may be secured against rotation relative to the strut 4 or the upper mount portion 36 without departing from the spirit and scope of the invention. However, in the preferred embodiment shown in the drawings, the shaft 42 is free to rotate with respect to both the strut 4 and the upper mount portion 36. In addition, a small amount of lateral clearance is preferably provided between the end caps 46 and the vertical isolator housings 56, described below, to prevent binding of the shaft 42.

The mounting and vibration dampening system of the invention also includes first and second isolator means positioned between the upper mount portion 36 and the engine support strut 4. The two isolator means are independent of each other and dampen vertical and lateral vibrations, respectively. Both isolator means are positioned around the pivot axis X. In the preferred embodiment shown in the drawings, each of the isolator means includes alternating layers of an elastomeric material and metal. The thin metal layers are bonded between the thin elastomeric layers to increase the compression load capability of the isolator means. The aft engine mount 20 is dimensioned and the first and second isolator means are positioned to locate the elastomeric layers of each isolator means far enough away from the engine 6 to prevent heat from the engine 6 from impairing the functioning of the isolator means. Preferably, each of the elastomeric layers is in a location where the maximum normal operating temperature is less than about 300° F.

Referring to FIGS. 3-5, 7, and 9, the vertical isolating means includes two laterally spaced vertical isolators 52 positioned vertically between the reduced diameter end portions 44 of the shaft 42 and the strut 4. Each vertical isolator 52 includes a rectangular housing 56 having a cylindrical opening 58 extending laterally therethrough for closely receiving the corresponding reduced diameter portion 44 of the shaft 42. The close fit between shaft portion 44 and housing 56 positions the housing 56 to move vertically with the shaft 42. Two recesses 60 open onto opposite surfaces of and extend vertically into the housing 56. The recesses 60 receive upper and lower shock absorbing members 62, 64, respectively.

The isolator members 62, 64 are rectangular in shape, as shown in FIG. 5, and have alternating elastomeric layers 71 and metal layers 70, as described above. The radially inner end of each isolator member 62, 64 is bonded to the inner surface of the corresponding recess 60. As shown in FIG. 4, a small amount of clearance is provided between the vertical sides of each isolator member 62, 64 and the adjacent walls of the corresponding recess 60 to allow for expansion of the elastomeric layers 71 when the isolator member 62, 64 is compressed vertically. The layers 70, 71 of metal and elastomeric material are positioned horizontally in the assembled system so that vertical loads are reacted in compression.

In order to accommodate the ends 44 of the shaft 42 and the vertical isolators 52, a generally rectangular opening 54 is provided on each side of the strut 4, as shown in FIGS. 3, 4, and 9. The radially outer end of the upper isolator member 62 abuts the downwardly-facing surface of the strut 4 defining the top of the opening 54, and the radially outer end of the lower isolator member 64 abuts the upwardly-facing surface of the strut 4 defining the bottom of the opening 54. Vertical movement of the engine 6 relative to the strut 4 is dampened by compression of the isolator members 62, 64 between the isolator housing 56 and the strut 4, with the vertical movement being transmitted from the engine 6 to the housing 56 via the aft engine mount 20 and the shaft 42.

In the preferred embodiment shown in the drawings, each opening 54 in the strut 4 opens onto the outer side of the strut 4 to provide an access opening 66 to facilitate installation, inspection, and maintenance of the vertical isolators 52. When the aircraft is in use, each access opening 66 is covered by an access door 68. As can be seen in FIGS. 3 and 4, the access openings 66 are adjacent to the reduced diameter end portions 44 of the shaft 42 and the vertical isolators 52 carried thereby. Each isolator housing 56 is axially slidable along the corresponding end portion 44 of the shaft 42 so that the vertical isolator 52 may be easily and quickly removed for inspection and/or replacement. All that is required to remove the isolator 52 is to open the door 68, remove the bolt 48 and the end cap 46, and slide the isolator 52 off the shaft end 44 and out through the opening 66. Initial installation or reinstallation of the isolator 52 is accomplished simply by reversing this process.

Referring to FIGS. 3, 4, 6, and 10, the preferred embodiment of the lateral isolator means includes two laterally spaced annular isolators 72 concentrically surrounding and spaced from the shaft 42. In order to provide space for the lateral isolators 72 while minimizing the lateral distance between the upper mount portion 36 and the strut 4, the strut 4 is provided with a laterally extending passageway 74 corresponding to each lateral isolator 72. The passageways 74 open onto opposite sides of the opening 39 which receives the upper mount portion 36 and communicates the opening 39 with the rectangular openings 54 into which the vertical isolators 52 are received.

Each passageway 74 is defined by a cylindrical sidewall 76. Each lateral isolator 72 includes an annular hat-shaped housing 78 and an annular isolator member 92. The housing 78 has a laterally extending cylindrical wall 80 which abuts the inner cylindrical sidewall 76 of the corresponding passageway 74. The housing 78 also includes laterally opposite vertical flanges 82, 88. The flange 82 extends radially inwardly from the laterally (axially) outer end of the cylindrical wall 80 and defines an annular passageway 86 through the housing 78 through which the shaft 42 extends. As is most clearly seen in FIG. 4, the flange 82 concentrically surrounds and is spaced from the shaft 42. The flange 88 extends radially outwardly from the opposite laterally inner end of the cylindrical wall 80 to form the brim of the "hat". The laterally outer radial surface of the flange 88 abuts a surface 90 of the strut 4 which faces the upper mount portion 36 to securely mount the housing 78 onto the strut 4 and react lateral loads on the flange 82 through the strut 4. The housing 78 is both a part of the engine support strut assembly and a part of the lateral isolator means. It may be secured to the strut 4 to make it a part of the engine support structure by a variety of means. In the preferred embodiment, the housing 78 is press fit into the passageway 74.

The annular isolator member 92 of each lateral isolator 72 is positioned between the vertical flange 82 and the upper mount portion 36. The laterally (axially) outer end 96 of the isolator member 92 is bonded to the inner annular radial surface 84 of the flange 82. Clearance is provided between the isolator member 92 and the cylindrical wall 80 to allow for expansion of the elastomeric portion of the isolator member 92. The opposite laterally inner end 94 of the isolator member 92 abuts the vertical surface of the upper engine mount 36 facing strut surface 90. Lateral movement of the engine mount 20 relative to the strut 4 compresses the isolator member 92 between the flange 82 and the upper mount portion 36. As can be seen in FIGS. 3, 4, and 6, the isolator member includes alternating annular layers of metal 100 and an elastomeric material 102. These layers are arranged vertically so that lateral vibrations will be dampened by the isolator members 92 in compression.

In the preferred embodiment of the invention, the vertical and lateral isolators 52, 72 are structurally separate from each other and function independently to dampen vertical and lateral vibrations, respectively, in compression. The isolators 52, 72 may also resist vertical and lateral vibrations in shear, but the amount of resistance in shear is negligible. The preferred embodiment of the mounting and dampening system of the invention described above is designed to maximize the efficient use of the limited space available for such systems in modern aircraft. The efficient use of space and the consequent ability to position the isolators in a relatively cool area make it possible to use elastomeric materials in the isolators. The use of elastomeric materials to independently resist vertical and lateral vibrations makes it possible to independently and accurately adjust the vertical and lateral stiffnesses of the dampening system to meet the particular needs of a particular situation. The spring rates of elastomeric materials are predictable and may easily be calculated using known methods. Therefore, the system of the invention provides a means for obtaining accurate and effective dampening of engine vibrations.

Throughout the description of the structure and operation of the preferred embodiment of the system of the invention, the terms "vertical", "lateral", "upper", "lower", and the like have been used. These terms have been used for the purposes of more clearly illustrating and describing the invention and of illustrating a typical use attitude of the apparatus of the invention. The terms are not intended to indicate that the use attitude of the apparatus is limited to that shown in the drawings in which the engine is mounted below the engine support structure. It is intended to be understood that the apparatus of the invention can be used to advantage in other attitudes, such as an arrangement in which a fuselage mounted engine is mounted laterally adjacent to the engine support structure.

It will be obvious to those skilled in the art to which the invention is addressed that the invention may be used to advantage in a variety of situations. Therefore, it is also to be understood by those skilled in the art that various changes, modifications, and omissions in form and detail may be made without departing from the spirit and scope of the invention as defined by the following claims.

What is claimed is:

1. In an aircraft of the type having an engine support structure, a system for mounting a jet engine on said structure and dampening engine vibrations, said system comprising;

an engine mount having a first end portion attached to the engine, and an opposite second end portion;

connecting means for pivotably connecting said second end portion to said structure; said connecting means defining a laterally extending pivot axis; and first and second isolator means for dampening vertical and lateral vibrations, respectively; said first and second isolator means being independent of each other, and positioned between said second end portion and said structure and around said pivot axis; and each of said isolator means including elastomeric elements;

said engine mount being dimensioned and said first and second isolator means being positioned to locate said elastomeric elements of each isolator means far enough away from the engine to prevent heat from the engine from impairing the functioning of the isolator means.

2. A system as described in claim 1, in which each of said elastomeric elements is in a location where the maximum normal operating temperature is less than about 300° F.

3. A system as described in claim 1, in which the connecting means includes shaft portions that define said pivot axis and that are positioned to move vertically with said second end portion, and the first isolator means is positioned vertically between said shaft portions and said structure and has an upper portion located above said shaft portions and a lower portion located below said shaft portions.

4. A system as described in claim 1, in which the connecting means includes a shaft that extends laterally through aligned openings in said second end portion and said structure and is positioned to move vertically with said second end portion; and the second isolator means comprises two laterally spaced annular isolator members concentrically surrounding and spaced from the shaft and having one radial end abutting said second end portion of the engine mount and an opposite radial end abutting said structure.

5. In an aircraft of the type having an engine support structure, a system for mounting a jet engine on said structure and dampening engine vibrations, said system comprising:

an engine mount having a first end portion attached to the engine, and an opposite second end portion;

connecting means for pivotably connecting said second end portion to said structure; said connecting means defining a laterally extending pivot axis; and first and second isolator means for dampening vertical and lateral vibrations, respectively; said first and second isolator means being independent of each other, and positioned between said second end portion and said structure and around said pivot axis; and each of said isolator means including elastomeric elements;

said engine mount being dimensioned and said first and second isolator means being positioned to locate said elastomeric elements of each isolator means far enough away from the engine to prevent heat from the engine from impairing the functioning of the isolator means;

said connecting means including shaft portions that define said pivot axis and that are positioned to move vertically with said second end portion, and said first isolator means being positioned vertically between said shaft portions and said structure and having an upper portion located above said shaft portions and a lower portion located below said shaft portions; and said shaft portions being opposite end portions of a shaft that extends laterally through aligned openings in said second end portion of the engine mount and said structure and is positioned to move vertically with said second end portion of the engine mount; and said first isolator means comprising an isolator housing corresponding to each of said end portions of the shaft and surrounding and positioned to move vertically with the corresponding end portion of the shaft, an upper shock absorbing member corresponding to each housing and having a lower end abutting the corresponding housing and an upper end abutting said structure, and a lower shock absorbing member corresponding to each housing and having a lower end abutting said structure and an upper end abutting the corresponding housing.

6. A system as described in claim 5, in which said structure includes an access opening adjacent to each of said end portions of the shaft, and each isolator housing is axially slidable along the corresponding end portion of the shaft.

7. In an aircraft of the type having an engine support structure, a system for mounting a jet engine on said structure and dampening engine vibrations, said system comprising:

an engine mount having a first end portion attached to the engine, and an opposite second end portion:

connecting means for pivotably connecting said second end portion to said structure; said connecting means defining a laterally extending pivot axis; and first and second isolator means for dampening vertical and lateral vibrations, respectively; said first and second isolator means being independent of each other, and positioned between said second end portion and said structure and around said pivot axis; and each of said isolator means including elastomeric elements;

said engine mount being dimensioned and said first and second isolator means being positioned to locate said elastomeric elements of each isolator means far enough away from the engine to prevent heat from the engine from impairing the functioning of the isolator means;

said connecting means including a shaft that extends laterally through aligned openings in said second end portion and said structure and is positioned to move vertically with said second end portion; and said second isolator means comprising two laterally spaced annular isolator members that concentrically surround and are spaced from the shaft and have one radial end abutting said second end portion of the engine mount and an opposite radial end abutting said structure; and said structure including a strut, and an annular housing corresponding to each isolator member of the second isolator means; each said annular housing having a vertical flange against which said opposite radial end of the corresponding isolator member abuts; and each said annular housing being removably secured to the strut.

8. A system as described in claim 7, in which the strut includes a passageway corresponding to each said annular housing and defined by an inner cylindrical sidewall; each said annular housing is generally hat-shaped; and each said annular housing includes a laterally extending wall which abuts the inner cylindrical sidewall of the corresponding passageway and from one end of which said vertical flange extends radially inwardly toward the shaft, and a vertical mounting flange that extends radially outwardly from the other opposite end of said laterally extending wall and that abuts a surface of the strut facing said second end portion of the engine mount.

9. In an aircraft of the type having an engine support structure, a system for mounting a jet engine on said structure and dampening engine vibrations, said system comprising:

an engine mount having a first end portion attached to the engine, and an opposite second end portion;

connecting means for pivotably connecting said second end portion to said structure; said connecting means defining a laterally extending pivot axis; and first and second isolator means for dampening vertical and lateral vibrations, respectively; said first and second isolator means being independent of each other, and positioned between said second end portion and said structure and around said pivot axis; and each of said isolator means including elastomeric elements;

said engine mount being dimesioned and said first and second isolator means being positioned to locate said elastomeric elements of each isolator means for enough away from the engine to prevent heat from the engine from impairing the functioning of the isolator means; and said connecting means including a shaft that extends laterally through aligned openings in said second end portion and said structure and is positioned to move vertically with said second end portion; said first isolator means being positioned vertically between said shaft and said structure and having an upper portion located above said shaft and a lower portion located below said shaft; and said second isolator means comprising two laterally spaced annular isolator members that concentrically surround and are spaced from the shaft and have one radial end abutting said second end portion of the engine mount and an opposite radial end abutting said structure.

10. A system as described in claim 9, in which the shaft has opposite end portions; and the first isolator means comprises an isolator housing corresponding to each of said end portions of the shaft and surrounding and positioned to move vertically with the corresponding end portion of the shaft, an upper shock absorbing member corresponding to each housing and having a lower end abutting the corresponding housing and an upper end abutting said structure, and a lower shock absorbing member corresponding to each housing and having a lower end abutting said structure and an upper end abutting the corresponding housing.

11. A system as described in claim 10, in which said structure includes an access opening adjacent to each of said end portions of the shaft, and each isolator housing is axially slidable along the corresponding end portion of the shaft.

12. A system as described in claim 9, in which said structure includes a strut, and an annular housing corresponding to each isolator member of the second isolator means; each said annular housing having a vertical flange against which said opposite radial end of the corresponding isolator member abuts; and each said annular housing being removably secured to the strut.

13. A system as described in claim 12, in which the shaft has opposite end portions; and the first isolator means comprises an isolator housing corresponding to each of said end portions of the shaft and surrounding and positioned to move vertically with the corresponding end portion of the shaft, an upper shock absorbing member corresponding to each isolator housing and having a lower end abutting the corresponding isolator housing and an upper end abutting said structure, and a lower shock absorbing member corresponding to each isolator housing and having a lower end abutting said structure and an upper end abutting the corresponding isolator housing.

14. A system as described in claim 13, in which said structure includes an access opening adjacent to each of said end portions of the shaft, and each isolator housing is axially slidable along the corresponding end portion of the shaft.

15. A system as described in claim 12, in which the strut includes a passageway corresponding to each said annular housing and defined by an inner cylindrical sidewall; each said annular housing is generally hat-shaped; and each said annular housing includes a laterally extending wall which abuts the inner cylindrical sidewall of the corresponding passageway and from one end of which said vertical flange extends radially inwardly toward the shaft, and a vertical mounting flange that extends radially outwardly from the other opposite end of said laterally extending wall and that abuts a surface of the strut facing said second end portion of the engine mount.

16. A system as described in claim 15, in which the shaft has opposite end portions; and the first isolator means comprises an isolator housing corresponding to each of said end portions of the shaft and surrounding and positioned to move vertically with the corresponding end portion of the shaft, an upper shock absorbing member corresponding to each isolator housing and having a lower end abutting the corresponding isolator housing and an upper end abutting said structure, and a lower shock absorbing member corresponding to each isolator housing and having a lower end a axially slidable along the corresponding end portion of the shaft.

17. A system as described in claim 16, in which said structure includes an access opening adjacent to each of said end portions of the shaft, and each isolator housing is axially slidable along the corresponding end portion of the shaft.

18. A system as described in claim 17, in which each of said elastomeric elements is in a location where the maximum normal operating temperature is less than about 300° F.

19. A system as described in claim 9, in which each of said elastomeric elements is in a location where the maximum normal operating temperature is less than about 300° F.

20. In an aircraft of the type having an engine support structure, a system for mounting on said structure a turbojet engine having an aft turbine section, and for dampening engine vibrations, said system comprising:
  an aft engine mount having a first end portion attached to an aft portion of the engine, and an opposite second end portion;
  connecting means for pivotably connecting said second end portion to said structure; said connecting means defining a laterally extending pivot axis; and
  first and second isolator means for dampening vertical and lateral vibrations, respectively; said first and second isolator means being independent of each other, and positioned between said second end portion and said structure and around said pivot axis; and each of said isolator means including elastomeric elements;
  said engine mount being dimensioned and said first and second isolator means being positioned to locate said elastomeric elements of each isolator means far enough away from said turbine section of the engine to prevent heat from said turbine section from impairing the functioning of the isolator means.

21. A system as described in claim 20, in which each of said elastomeric elements is in a location where the maximum normal operating temperature is less than about 300° F.

22. In an aircraft of the type having an engine support structure, a system for mounting on said structure a turbojet engine having an aft turbine section, and for dampening engine vibrations, said system comprising:
  an aft engine mount having a first end portion attached to an aft portion of the engine, and an opposite second end portion;
  connecting means for pivotably connecting said second end portion to said structure; said connecting means defining a laterally extending pivot axis; and
  first and second isolator means for dampening vertical and lateral vibrations, respectively; said first and second isolator means being independent of each other, and positioned between said second end portion and said structure and around said pivot axis; and each of said isolator means including elastomeric elements;
  said engine mount being dimensioned and said first and second isolator means being positioned to locate said elastomeric elements of each isolator means far enough away from said turbine section of the engine to prevent heat from said turbine section from impairing the functioning of the isolator means; and said connecting means including a shaft that extends laterally through aligned openings in said second end portion and said structure and is positioned to move vertically with said second end portion; said first isolator means being positioned vertically between said shaft and said structure and having an upper portion located above said shaft and a lower portion located below said shaft; and said second isolator means comprising two laterally spaced annular isolator members that concentrically surround and are spaced from the shaft and have one radial end abutting said second end portion of the engine mount and an opposite radial end abutting said structure.

23. A system as described in claim 22, in which the shaft has opposite end portions; and the first isolator means comprises an isolator housing corresponding to each of said end portions of the shaft and surrounding and positioned to move vertically with the corresponding end portion of the shaft, an upper shock absorbing member corresponding to each isolator housing and having a lower end abutting the corresponding isolator housing and an upper end abutting said structure, and a lower shock absorbing member corresponding to each isolator housing and having a lower end abutting said structure and an upper end abutting the corresponding isolator housing.

24. A system as described in claim 23, in which said structure includes a strut, and an annular housing corresponding to each isolator member of the second isolator means; each said annular housing having a vertical flange against which said opposite radial end of the corresponding isolator member abuts; and each said annular housing being removably secured to the strut; and in which said structure includes an access opening adjacent to each of said end portions of the shaft; and each isolator housing is axially slidable along the corresponding end portion of the shaft.

25. In an aircraft of the type having an engine support structure, a system for mounting a jet engine on said structure and dampening engine vibrations, said system comprising:

an engine mount having a first end portion attached to the engine, and an opposite second end portion;
connecting means for pivotably connecting said second end portion to said structure; said connecting means including shaft portions that define a laterally extending pivot axis and that are positioned to move vertically with said second end portion;
first isolator means for dampening vertical vibrations; said first isolator means being positioned vertically between said shaft portions and said structure and having an upper portion located above said shaft portions and a lower portion located below said shaft portions; and
second isolator means for dampening lateral vibrations; said second isolator means including two laterally spaced annular isolator members concentrically surrounding and spaced from said shaft portions and having one radial end abutting said second end portion of the engine mount and an opposite radial end abutting said structure;
said first and second isolator means being independent of each other.

26. In an aircraft of the type having an engine support structure, a system for mounting a jet engine on said structure and dampening engine vibrations, said system comprising:

an engine mount having a first end portion attached to the engine, and an opposite second end portion;
connecting means for pivotably connecting said second end portion to said structure; said connecting means including shaft portions that define a laterally extending pivot axis and that are positioned to move vertically with said second end portion;
first isolator means for dampening vertical vibrations; said first isolator means being positioned vertically between said shaft portions and said structure and having an upper portion located above said shaft portions and a lower portion located below said shaft portions; and
second isolator means for dampening lateral vibrations; said second isolator means including two laterally spaced annular isolator members concentrically surrounding and spaced from said shaft portions and having one radial end abutting said second end portion of the engine mount and an opposite radial end abutting said structure;
in which said first and second isolator means are independent of each other; and
in which said shaft portions are opposite end portions of a shaft that extends laterally through aligned openings in said second end portion of the engine mount and said structure and is positioned to move vertically with said second end portion of the engine mount; and the first isolator means comprises an isolator housing corresponding to each of said end portions of the shaft and surrounding and positioned to move vertically with the corresponding end portion of the shaft, an upper shock absorbing member corresponding to each housing and having a lower and abutting the corresponding housing and an upper end abutting said structure, and a lower shock absorbing member corresponding to each housing and having a lower end abutting said structure and an upper end abutting the corresponding housing.

27. A system as described in claim 26, in which said structure includes an access opening adjacent to each of said end portions of the shaft, and each isolator housing is axially slidable along the corresponding end portion of the shaft 28. A system as described in claim 27, in which said structure includes a strut, and an annular housing corresponding to each isolator member of the second isolator means; each said annular housing having a vertical flange against which said opposite radial end of the corresponding isolator member abuts; and each said annular housing being removably secured to the strut.

29. A system as described in claim 28, in which the strut includes a passageway corresponding to each said annular housing and defined by an inner cylindrical sidewall; each said annular housing is generally hat-shaped; and each said annular housing includes a laterally extending wall which abuts the inner cylindrical sidewall of the corresponding passageway and from one end of which said vertical flange extends radially inwardly toward the shaft, and a vertical mounting flange that extends radially outwardly from the other opposite end of said laterally extending wall and that abuts a surface of the strut facing said second end portion of the engine mount.

30. A system as described in claim 26, in which said structure includes a strut, and an annular housing corresponding to each isolator member of the second isolator means; each said annular housing having a vertical flange against which said opposite radial end of the corresponding isolator member abuts; and each said annular housing being removably secured to the strut.

31. A system as described in claim 30, in which the strut includes a passageway corresponding to each said annular housing and defined by an inner cylindrical sidewall; each said annular housing is generally hat-shaped; and each said annular housing includes a laterally extending wall which abuts the inner cylindrical sidewall of the corresponding passageway and from one end of which said vertical flange extends radially inwardly toward the shaft, and a vertical mounting flange that extends radially outwardly from the other opposite end of said laterally extending wall and that abuts a surface of the strut facing said second end portion of the engine mount.

* * * * *

UNITED STATES PATENT AND TRADEMARK OFFICE
CERTIFICATE OF CORRECTION

PATENT NO. : 4,717,094

DATED : January 5, 1988

INVENTOR(S) : Wan T. Chee

It is certified that error appears in the above-identified patent and that said Letters Patent are hereby corrected as shown below:

Column 1, line 30, "desings" should be -- designs --.

Claim 9, column 12, line 56, "dimesioned" should be -- dimensioned --.

Claim 9, column 12, line 59, "for" should be -- far --.

Claim 16, column 14, lines 5 and 6, change "a axially slidable along the corresponding end portion of the shaft" to -- abutting said structure and an upper end abutting the corresponding isolator housing --.

Claim 26, column 16, line 38, "and" should be -- end --.

Signed and Sealed this

Twenty-first Day of June, 1988

Attest:

DONALD J. QUIGG

*Attesting Officer*

*Commissioner of Patents and Trademarks*